United States Patent
Matsuo et al.

(10) Patent No.: US 8,226,358 B2
(45) Date of Patent: Jul. 24, 2012

(54) TURBINE AND TURBOCHARGER HAVING THE SAME

(75) Inventors: Atsushi Matsuo, Nakagasaki (JP); Takao Yokoyama, Nakagasaki (JP); Motoki Ebisu, Tana (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 824 days.

(21) Appl. No.: 12/324,385

(22) Filed: Nov. 26, 2008

(65) Prior Publication Data

US 2009/0220335 A1    Sep. 3, 2009

(30) Foreign Application Priority Data

Feb. 29, 2008   (JP) .................................. 2008-051044

(51) Int. Cl.
*F04D 29/40* (2006.01)

(52) U.S. Cl. ........ 415/151; 415/184; 415/191; 415/195; 415/212.1; 60/602

(58) Field of Classification Search .......... 415/148–167, 415/184–186, 191, 205, 208.2, 208.3, 211, 415/211.1, 195, 209.1, 209.3, 209.4, 212.1; 60/602

See application file for complete search history.

(56) References Cited

U.S. PATENT DOCUMENTS 4,381,171 A * 4/1983 Chapple .................. 415/204
6,073,447 A * 6/2000 Kawakami et al. ......... 60/602

FOREIGN PATENT DOCUMENTS

| JP | 09-256802 | * | 9/1997 |
| JP | 9-256802 A | | 9/1997 |
| JP | 10-008977 A | | 1/1998 |
| JP | 11-270343 | * | 10/1999 |
| JP | 11-270343 A | | 10/1999 |
| JP | H11-280482 | * | 10/1999 |
| JP | 2000-45784 A | | 2/2000 |
| JP | 2000-110572 | * | 4/2000 |
| JP | 2000-110572 A | | 4/2000 |
| JP | 2000-213359 | * | 8/2000 |
| JP | 2000-213359 A | | 8/2000 |

* cited by examiner

*Primary Examiner* — Steven Loke
*Assistant Examiner* — Victoria Hall
(74) *Attorney, Agent, or Firm* — Birch, Stewart, Kolasch & Birch, LLP

(57) ABSTRACT

A turbine reduces variations in mass flow at throats even when the flow rate of fluid is low or high. The turbine includes a turbine rotor having turbine blades; a turbine housing accommodating the turbine rotor 80 and whose cross-sectional area of a scroll portion formed between the turbine housing and the turbine rotor gradually decreases; a plurality of fixed vanes fixed along a curved line dividing the scroll portion into an inner scroll part and an outer scroll part; throats formed between the adjacent fixed vanes and communicate between the inner scroll part and the outer scroll part; and a switch valve which switches a flow path in the turbine housing either to the inner scroll part or to both the inner scroll part and the outer scroll part, in which flow path areas of the throats are reduced in a downstream direction of the scroll portion.

6 Claims, 9 Drawing Sheets

FIXED-VANE THROAT NUMBER

WHEN FLOW RATE IS LOW

WHEN FLOW RATE IS HIGH

TURBINE AND TURBOCHARGER HAVING THE SAME

BACKGROUND OF THE INVENTION

1. Field of the Invention

The present invention relates to a variable geometry turbine and a turbocharger having the same.

This application is based on Japanese Patent Application No. 2008-051044, the content of which is incorporated herein by reference.

2. Description of Related Art

A conventionally known turbine provided for a variable geometry turbocharger is, for example, the technology disclosed in Japanese Unexamined Patent Application, Publication No. HEI-10-8977. The turbine includes communicating parts (hereinafter, referred to as "throats") that radially divide a scroll portion into an inner scroll part and an outer scroll part and communicate between the inner scroll part and the outer scroll part, and a switch valve that switches the flow of fluid between a flow into the inner scroll part and a flow into both the inner and outer scroll parts. The flow path is switched by the switch valve depending on the flow rate of the fluid.

According to the above-mentioned technology, when the flow rate of the fluid is low, the switch valve is operated to make the fluid flow only into the inner scroll part to apply a rotary torque to a turbine rotor, making the turbine rotor rotate effectively. Further, when the flow rate of the fluid is high, the switch valve is operated to make the fluid also flow into the outer scroll part to make the mass flow uniform and apply a small rotary torque to the turbine rotor, preventing the turbine rotor from rotating more than necessary.

However, in the above-mentioned technology, when the flow rate of the fluid is high, the flow rate of fluid flowing from the outer scroll part into the inner scroll part via the throats changes depending on the positions of the throats. Specifically, as shown in FIG. 14, the flow rate of the fluid flowing from the outer scroll part into the inner scroll part via the throats increases in the downstream direction of the scroll portion. Fixed-vane throat numbers shown in FIG. 14 are sequentially assigned to the throats from the upstream side of the scroll portion. Further, when the flow rate of the fluid is low, the fluid flows from the inner scroll part into the outer scroll part via the throats. As a result, as shown in FIG. 15, outward flows via the throats occur upstream of the scroll portion and inward flows via the throats occur downstream of the scroll portion. Variations in the flow rate at the throats, shown in FIGS. 14 and 15, reduce the performance of the turbine.

SUMMARY OF THE INVENTION

The present invention has been made to solve the above-mentioned problems, and an object of the present invention is to provide a turbine capable of reducing variations in flow rate at throats even when the flow rate of fluid is low or high, to prevent a decrease in performance, and to provide a turbocharger having the same.

In order to solve the above-described problems, the present invention employs the following solutions.

According to a first aspect, the present invention provides a turbine including a turbine rotor which has turbine blades; a housing which accommodates the turbine rotor and whose cross-sectional area of a scroll portion formed between the housing and the turbine rotor gradually decreases; a plurality of fixed vanes which are fixed along a curved line dividing the scroll portion into an inner scroll part and an outer scroll part; communicating parts which are formed between the adjacent fixed vanes and communicate between the inner scroll part and the outer scroll part; and a switch valve which switches a flow path in the housing either to the inner scroll part or to both the inner scroll part and the outer scroll part, in which flow path areas of the communicating parts are reduced in a downstream direction of the scroll portion.

According to the first aspect, for example, when the flow rate of fluid flowing into the housing is high, the switch valve is used to make the fluid flow not only into the inner scroll part but also into the outer scroll part so as to increase the capacity of the scroll portion and to guide the fluid having a flow rate falling in a high-speed range to the turbine, thereby effectively rotating the turbine rotor. Since the flow path areas of the communicating parts, which communicate between the inner scroll part and the outer scroll part, are reduced in the downstream direction of the scroll portion, the pressure drop of the fluid is increased to reduce the flow speed at the downstream side of the scroll portion. Accordingly, the flow rate of fluid flowing from the outer scroll part into the inner scroll part via the communication parts can be equalized to effectively rotate the turbine rotor.

In the first aspect, distances between the adjacent fixed vanes may be reduced in the downstream direction of the scroll portion.

When the distances between the adjacent fixed vanes are reduced in the downstream direction of the scroll portion, the flow path areas of the communication parts are reduced without changing chord lengths of the fixed vanes, and therefore the turbine can be more easily designed and manufactured.

In the first aspect, chord lengths of the fixed vanes may be increased in the downstream direction of the scroll portion.

When the chord lengths of the fixed vanes are increased in the downstream direction of the scroll portion, the flow path areas of the communication parts are reduced without changing the distances (pitches) L between the centers of the adjacent fixed vanes, and therefore the turbine can be more easily designed and manufactured.

According to a second aspect, the present invention provides a turbine including a turbine rotor which has turbine blades; a housing which accommodates the turbine rotor and whose cross-sectional area of a scroll portion formed between the housing and the turbine rotor gradually decreases; a plurality of fixed vanes which are fixed along a curved line dividing the scroll portion into an inner scroll part and an outer scroll part; communicating parts which are formed between the adjacent fixed vanes and communicate between the inner scroll part and the outer scroll part; and a switch valve which switches a flow path in the housing either to the inner scroll part or to both the inner scroll part and the outer scroll part, in which a rate of change of A/R with respect to a fluid flow direction at a first position is made larger than a rate of change of A/R with respect to the fluid flow direction at a second position located at a downstream side of the first position, where A indicates a flow path area of the outer scroll part and R indicates a distance from a flow path center of the outer scroll part to a rotation center of the turbine rotor.

According to the second aspect, when the rate of change of A/R with respect to the fluid flow direction at the first position is made larger than the rate of change of A/R with respect to the fluid flow direction at the second position located at the downstream side of the first position, where A indicates the flow path area of the outer scroll part and R indicates the distance from the flow path center of the outer scroll part to the rotation center of the turbine rotor, the pressure of the fluid is increased at the upstream side of the outer scroll part and is decreased at the downstream side of the outer scroll part.

Accordingly, the flow rate of fluid flowing from the outer scroll part into the inner scroll part via the communication parts is increased at the upstream side of the outer scroll part and is decreased at the downstream side of the outer scroll part. Therefore, the flow rate of fluid flowing from the outer scroll part into the inner scroll part via the communication parts can be equalized to effectively rotate the turbine rotor.

According to a third aspect, the present invention provides a turbine including a turbine rotor which has turbine blades; a housing which accommodates the turbine rotor and whose cross-sectional area of a scroll portion formed between the housing and the turbine rotor gradually decreases; a plurality of fixed vanes which are fixed along a curved line dividing the scroll portion into an inner scroll part and an outer scroll part; communicating parts which are formed between the adjacent fixed vanes and communicate between the inner scroll part and the outer scroll part; and a switch valve which switches a flow path in the housing either to the inner scroll part or to both the inner scroll part and the outer scroll part, in which a line extended from a trailing edge of each of the fixed vanes at the side of the inner scroll part is directed farther inside, toward the inner scroll part, than a leading edge of an adjacent vane located at the downstream side of the fixed vanes.

According to the third aspect, for example, when the flow rate of fluid is low, the switch valve is used to make the fluid flow only into the inner scroll part to apply a rotary torque to the turbine rotor, making the turbine rotor effectively rotate. Further, when the line extended from the trailing edge of each of the fixed vanes at the side of the inner scroll part is directed farther inside, toward the inner scroll part, than the leading edge of an adjacent vane located at the downstream side of the fixed vanes, the fluid in the inner scroll part is prevented from colliding with the leading edges of the fixed vanes and flowing out to the outer scroll part via the communicating parts. Therefore, a decrease in performance of the turbine can be prevented.

According to a fourth aspect, the present invention provides a turbocharger including one of the above-described turbines; a shaft connected to the turbine rotor; a compressor rotor connected to the shaft at an end opposite to an end to which the turbine rotor is connected; and a compressor housing accommodating the compressor rotor.

According to the fourth aspect, when the turbine rotor is connected to the compressor rotor through the shaft and the turbine rotor is rotated, the compressor rotor is rotated to effectively supply fluid inside the compressor housing.

According to the present invention, even when the flow rate of fluid is low or high, variations in flow rate at throats are reduced to prevent a decrease in performance.

DETAILED DESCRIPTION OF THE INVENTION

First Embodiment

Hereinafter, a turbine and a turbocharger having a turbine according to a first embodiment of the present invention will be described with reference to the drawings.

Figure 1:
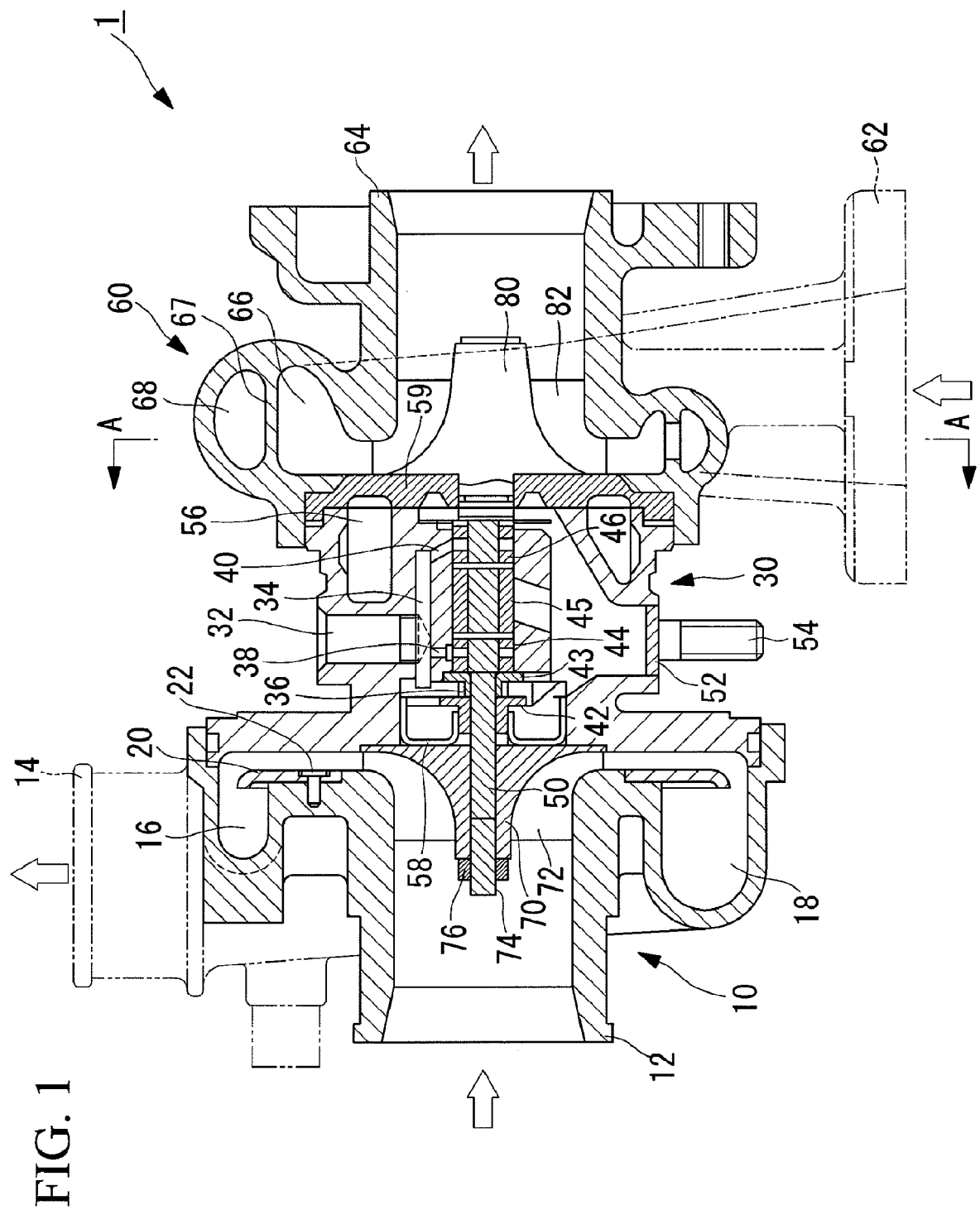
FIG. 1 is a longitudinal sectional view showing the overall configuration of a turbocharger according to the present invention.

FIG. 1 is a longitudinal sectional view showing a variable geometry turbocharger 1 according to this embodiment.

As shown in FIG. 1, a compressor housing 10 includes a compressor inlet port 12, a compressor discharge port 14, and ring-shaped scrolls 16 and 18. The scrolls 16 and 18 extend from a position adjacent to the compressor discharge port 14 in an outer circumferential direction of the compressor housing 10 and communicate with the compressor discharge port 14. As the scrolls 16 and 18 come closer to the compressor discharge port 14, their cross-sectional areas gradually increase. A diffuser 20 partitions the scrolls 16 and 18 and is attached to the compressor housing 10 by a bolt 22.

A lubricating-oil introduction port 32 is formed at the outer portion of a bearing housing 30 adjacent to the compressor housing 10. The lubricating-oil introduction port 32 is connected to branch oil paths 36, 38, and 40 via an oil path 34 which is formed in an axial direction and supplies lubricating oil supplied from an oil pump (not shown) to sliding surfaces between a shaft 50 and bearings 42, 43, 44, 45, and 46 which support the shaft 50. The lubricating oil supplied to the sliding surfaces is discharged from a lubricating-oil discharge port 54 via a space 52 provided inside the bearing housing 30. Reference numeral 56 denotes a path for cooling water used to cool the variable geometry turbocharger 1. Reference numeral 58 denotes a plate seal. Reference numeral 59 denotes a piece of the bearing housing 30 that is separated from the bearing housing 30 to form portions provided for the bearing housing 30. An exhaust gas inlet port 62 and an exhaust gas discharge port 64 are formed in a turbine housing 60 adjacent to the bearing housing 30.

To the shaft 50, supported by the bearings 42, 43, 44, 45, and 46 in the bearing housing 30, a compressor rotor 70 is fixed by a bolt 74 and a nut 76 at an end at the compressor housing 10 side such that relative rotation cannot be performed, and a turbine rotor 80 is fixed at the other end at the turbine housing 60 side such that relative rotation cannot be performed. The compressor rotor 70 and the turbine rotor 80 have compressor blades 72 and turbine blades 82, respectively, which extend in a radial direction. When the turbine rotor 80 is rotated, the compressor rotor 70 is rotated together therewith.

Figure 2:
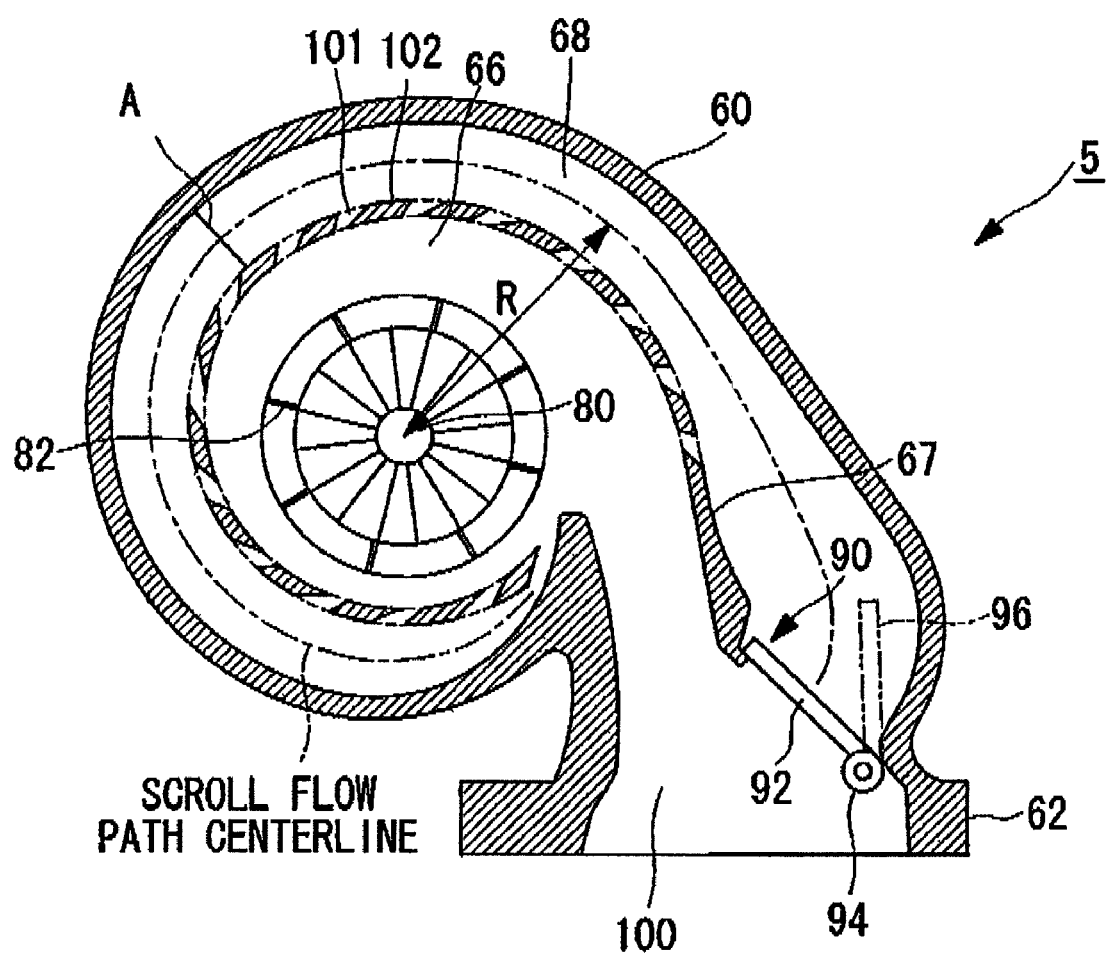
FIG. 2 is a cross-sectional view along A-A in FIG. 1.

FIG. 2 is a cross-sectional view along A-A in FIG. 1, and is a transverse sectional view of a turbine 5 provided for the variable geometry turbocharger 1.

As shown in FIG. 2, the turbine 5 includes the turbine rotor 80, which has the turbine blades 82, and the turbine housing 60. The turbine housing 60 accommodates the turbine rotor 80, and the cross-sectional area of a scroll portion 100 provided between the turbine rotor 80 and the turbine housing 60 is gradually reduced. The scroll portion 100 is divided by multiple fixed vanes 102 and an involute partition wall 67 which are fixed to the turbine housing 60, into an inner scroll part 66 and an outer scroll part 68 that has a capacity larger than the inner scroll part 66. Between the adjacent fixed vanes 102, multiple throats (communicating parts) 101 communicate between the inner scroll part 66 and the outer scroll part 68.

A switch valve 90 is provided at the side of the exhaust gas inlet port 62 of the turbine housing 60. The switch valve 90 is rotated around a rotation axis 94 by rotation means (not shown) to switch between a closed position 92 of the inlet port of the outer scroll part 68, which is indicated by a solid line in FIG. 2, and an open position 96 of the inlet port of the outer scroll part 68, which is indicated by a broken line in FIG. 2. The switch valve 90 thus switches the flow path in the turbine housing 60 to the inner scroll part 66 or to both the inner scroll part 66 and the outer scroll part 68.

Figure 3:
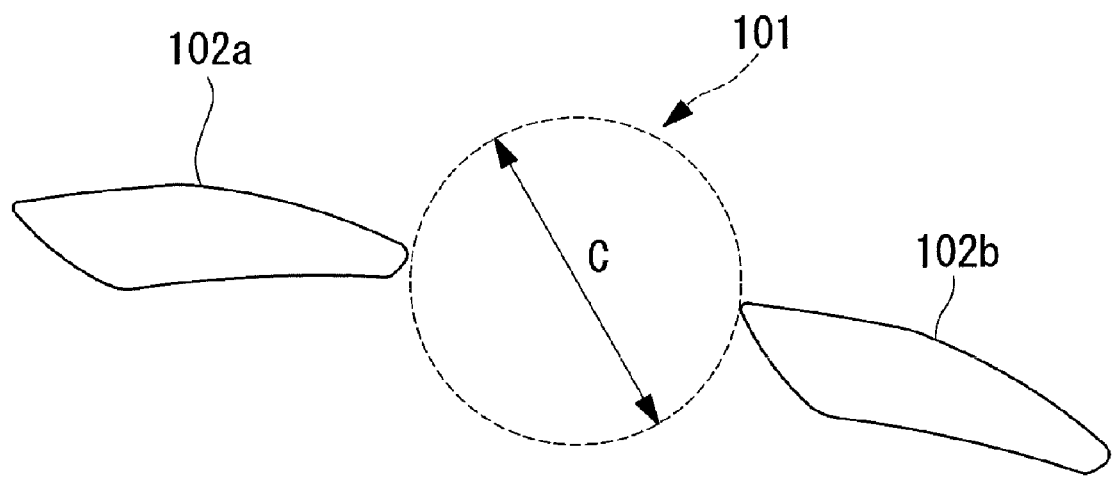
FIG. 3 is a partial enlarged view of a turbine according to a first embodiment.
Figure 4:
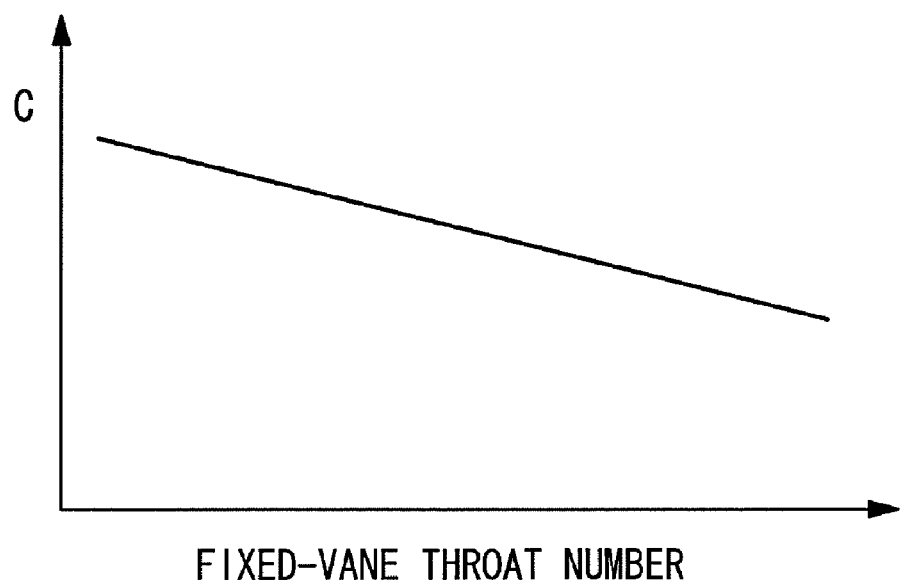
FIG. 4 is a graph showing the relationship between the lengths of throats in this embodiment and flow path positions.
Figure 5:
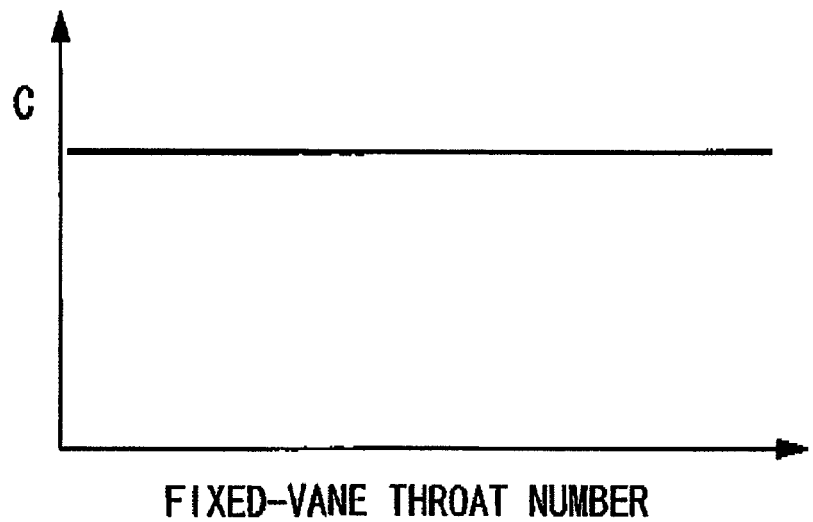
FIG. 5 is a graph showing the relationship between the lengths of throats in a conventional turbine and flow path positions.

The flow path areas of the throats 101 are reduced in the downstream direction of the scroll portion 100. Specifically, a distance C between a fixed vane 102a and a fixed vane 102b adjacent to the fixed vane 102a, shown in FIG. 3, is reduced in the downstream direction of the scroll portion 100 as shown in FIG. 4. Fixed-vane throat numbers shown in FIG. 4 are sequentially assigned to the throats 101 from the upstream side of the scroll portion 100. FIG. 5 shows the distance C between the fixed vanes 102 in a conventional turbine, in which the distance C between the fixed vanes 102 is constant irrespective of the position of the scroll portion 100.

Next, an operation of the variable geometry turbocharger 1, having the above-described structure, will be described.

Exhaust gas introduced from the exhaust gas inlet port 62 is guided to the scroll portion 100 inside the turbine housing 60, rotates the turbine rotor 80, and is discharged from the exhaust gas discharge port 64. The rotation of the turbine rotor 80 is transferred to the compressor rotor 70 via the shaft 50 to rotate the compressor rotor 70. The compressor rotor 70 compresses gas (air) guided to the compressor inlet port 12 and supplies the compressed gas from the compressor discharge port 14 to an internal-combustion engine (not shown).

Figure 13:
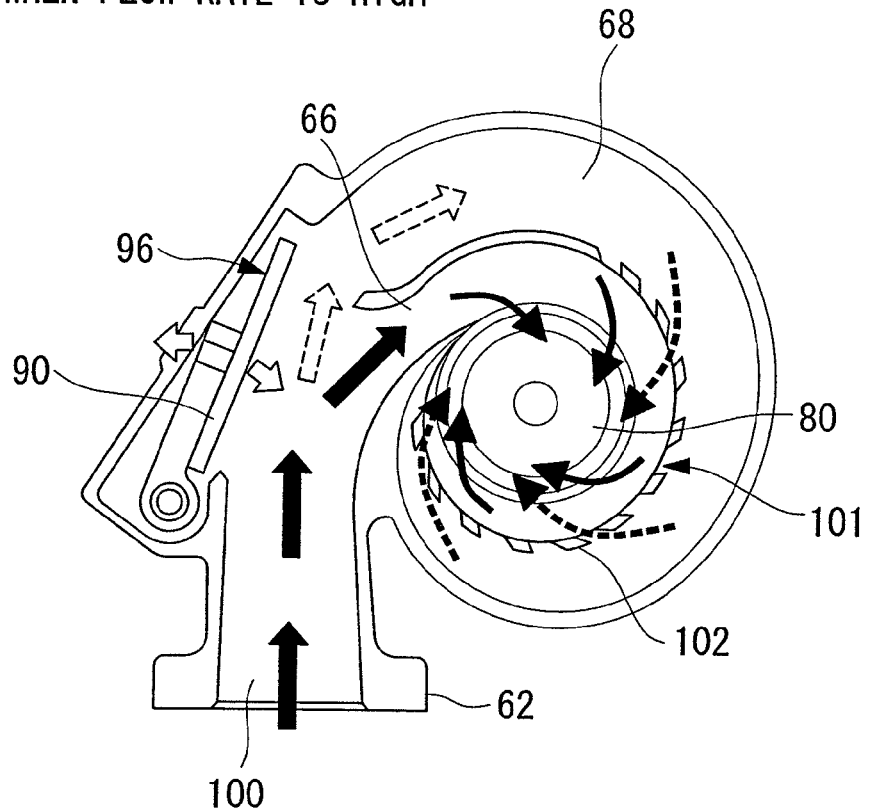
FIG. 13 is a diagram showing flow paths when the flow rate is high in the turbine shown in FIG. 2.
Figure 14:
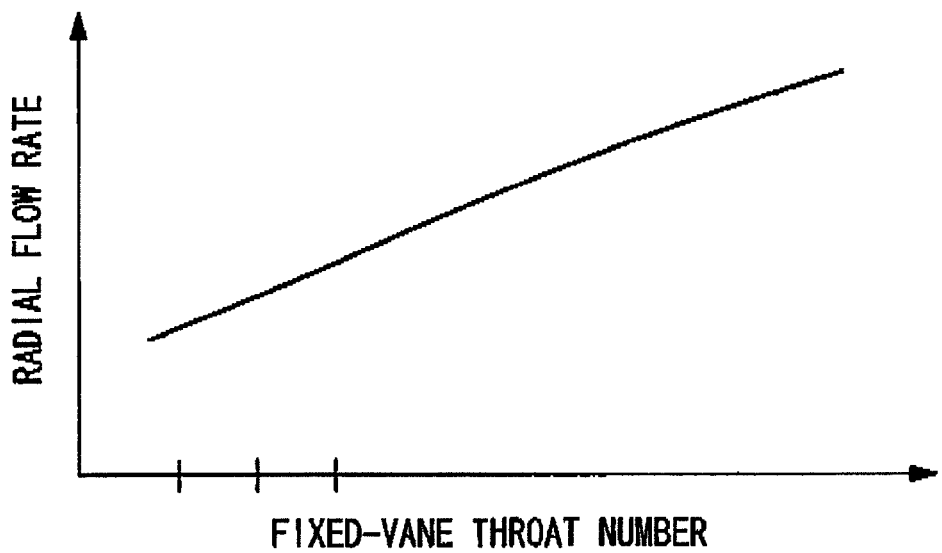
FIG. 14 is a graph showing the relationship between the flow rates and flow path positions when the flow rate is high in a conventional turbine.
Figure 15:
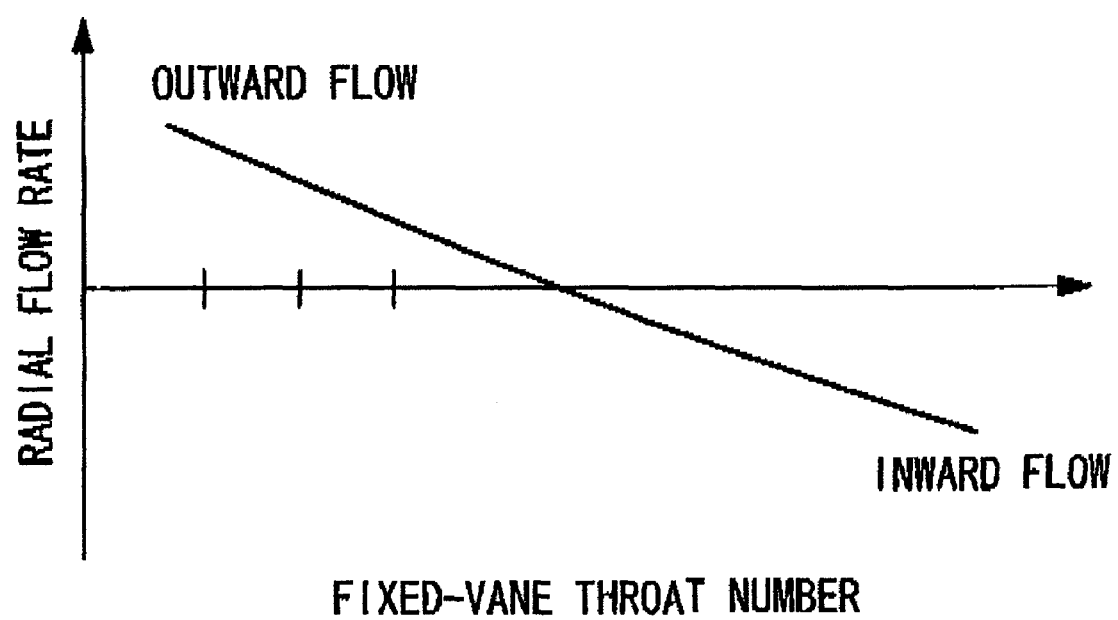
FIG. 15 is a graph showing the relationship between the flow rates and flow path positions when the flow rate is low in the conventional turbine.

As shown in FIG. 13, in a high-speed range where the flow rate of the exhaust gas is high, the switch valve 90 is switched to the open position 96 to open the inlet port of the outer scroll part 68 so as to guide the exhaust gas introduced from the exhaust gas inlet port 62 to the inner scroll part 66 and the outer scroll part 68. Accordingly, the capacity of the scroll portion 100 can be increased, and the turbine rotor 80 can be effectively rotated by guiding the exhaust gas having a flow rate falling in the high-speed range to the turbine rotor 80.

Figure 6:
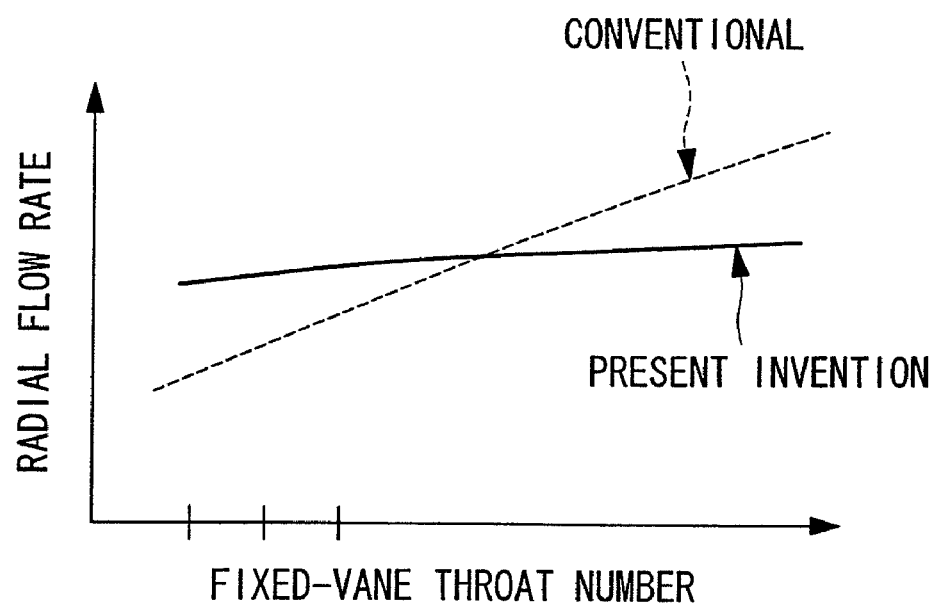
FIG. 6 is a graph showing the relationship between the flow rates and flow path positions, in the condition shown in FIG. 3.

Since the flow path areas of the throats 101, which communicate between the inner scroll part 66 and the outer scroll part 68, are reduced in the downstream direction of the scroll portion 100, reducing the mass flow at the downstream side of the scroll portion 100. Therefore, as shown in FIG. 6, the flow rate of fluid flowing from the outer scroll part 68 into the inner scroll part 66 via the throats 101 can be equalized, allowing the turbine rotor 80 to rotate more effectively.

Further, the distances between the adjacent fixed vanes 102 are reduced in the downstream direction of the scroll portion 100, so that the flow path areas of the throats 101 are reduced without changing the chord lengths of the fixed vanes 102, and therefore the turbine 5 can be more easily designed and manufactured.

Figure 7:
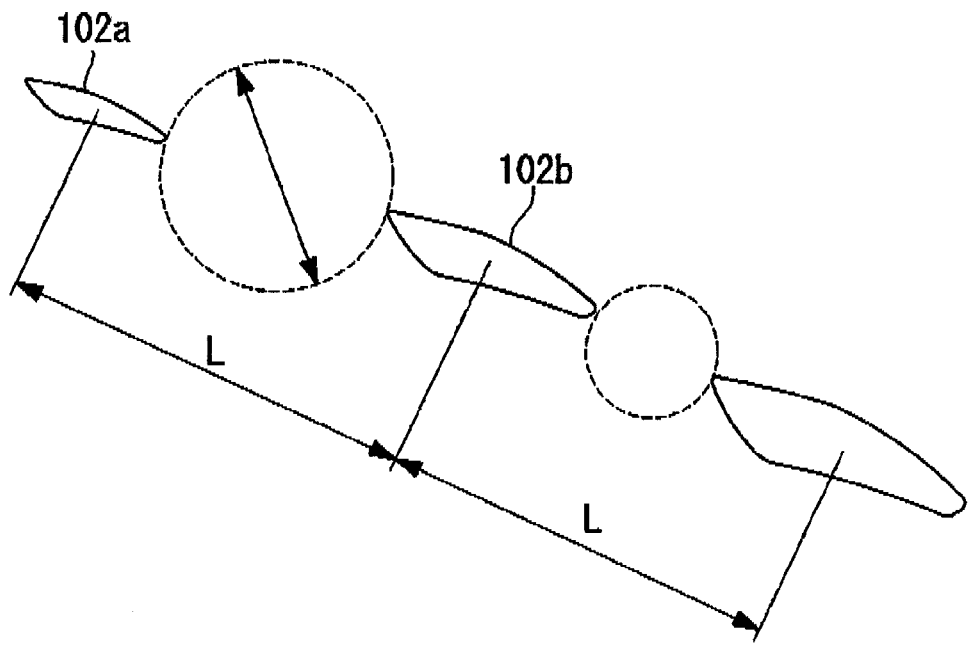
FIG. 7 is a partial enlarged view showing a modification of FIG. 3.

As shown in FIG. 7, the chord lengths of the fixed vanes 102 may be increased in the downstream direction of the scroll portion 100. Accordingly, the flow path areas of the throats 101 are reduced without changing a distance (pitch) L between the centers of the adjacent fixed vanes 102, and therefore the turbine 5 can be more easily designed and manufactured.

Second Embodiment

Next, a second embodiment of the present invention will be described with reference to FIGS. 8 and 9.

A turbine and a turbocharger having a turbine according to this embodiment differ from those of the first embodiment in that a value of A/R obtained by dividing a flow path area A of the outer scroll part 68 by a distance R from the flow path center of the outer scroll part 68 to the rotation center of the turbine rotor 80 is changed according to a predetermined rule. Hereinafter, the turbine and the turbocharger having a turbine of this embodiment will be described mainly in terms of differences from those of the first embodiment, and a description of similarities will be omitted.

Figure 8:
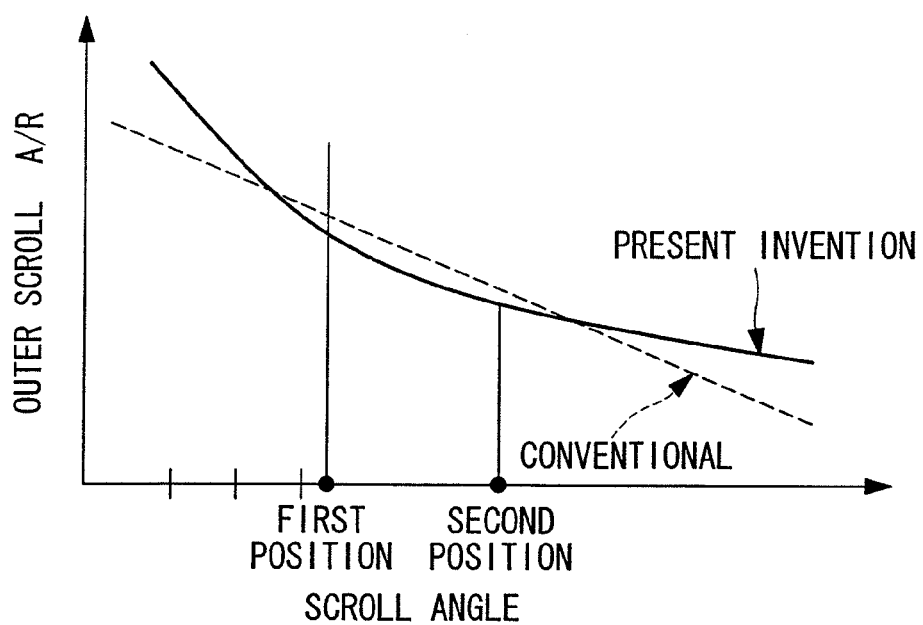
FIG. 8 is a graph showing the relationship between the flow path areas of an outer scroll part and flow path positions thereof, according to a second embodiment.
Figure 9:
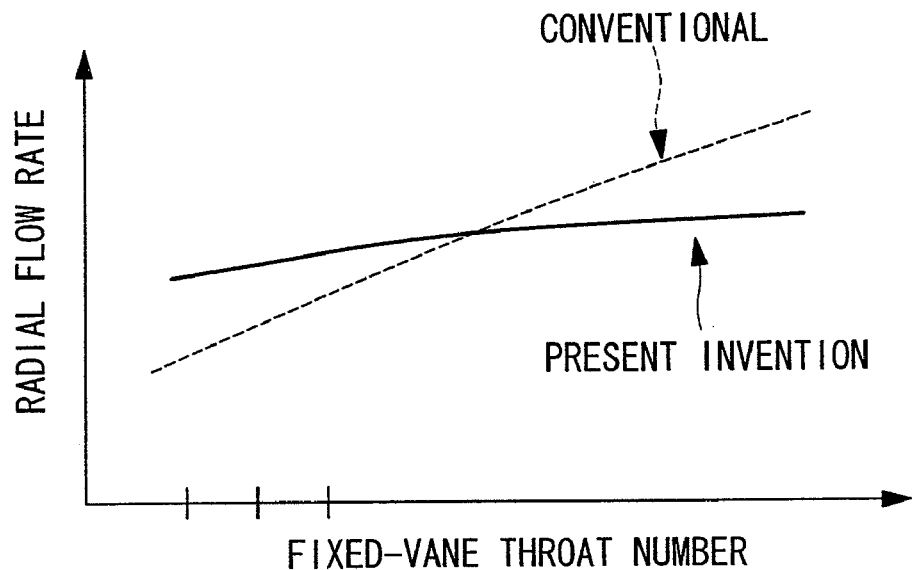
FIG. 9 is a graph showing the relationship between the flow rates and flow path positions, in the condition shown in FIG. 8.

FIG. 8 shows the relationship between a scroll angle and A/R, where, as shown in FIG. 2, A indicates the flow path area of the outer scroll part 68 and R indicates the distance from the flow path center of the outer scroll part 68 to the rotation center of the turbine rotor 80.

As shown in FIG. 8, A/R in a conventional turbine, indicated by a broken line, is reduced by a constant rate as the scroll angle increases. On the other hand, A/R in a turbine according to this embodiment, indicated by a solid line, has a smaller reduction rate as the scroll angle increases, forming a curve with a downward convex shape.

Therefore, the pressure of fluid is increased at the upstream side of the outer scroll part 68 and is decreased at the downstream side of the outer scroll part 68. Accordingly, the flow rate of fluid flowing from the outer scroll part 68 into the inner scroll part 66 via the throats 101 is increased at the upstream side of the outer scroll part 68 and is decreased at the downstream side of the outer scroll part 68. Therefore, as shown in FIG. 9, the flow rate of fluid flowing from the outer scroll part 68 into the inner scroll part 66 via the throats 101 can be equalized to effectively rotate the turbine rotor 80.

Note that the relationship between the scroll angle and A/R, shown in FIG. 8, does not always need to form a curve with a downward convex shape. The rate of change of A/R with respect to the scroll angle at a desired first position just needs to be larger than the rate of change of A/R with respect to the scroll angle at a second position located at a downstream side of the first position. For example, the relationship between the scroll angle and A/R may form a polygonal line shape obtained by connecting two line segments having different gradients at a position between the first position and the second position. Further, although the scroll angle is used as an example index indicating a position in the outer scroll part 68, any index indicating the flow direction of fluid can be used. For example, the distance from a predetermined position may be used.

Third Embodiment

Next, a third embodiment of the present invention will be described with reference to FIGS. 10 and 11.

A turbine and a turbocharger having a turbine according to this embodiment differ from those of the embodiments described above in that fixed vanes are inclined so as to limit the direction of the flow path of fluid in an inner scroll part. Hereinafter, the turbine and the turbocharger having a turbine of this embodiment will be described mainly in terms of differences from those of the embodiments described above, and a description of similarities will be omitted.

Figure 10:
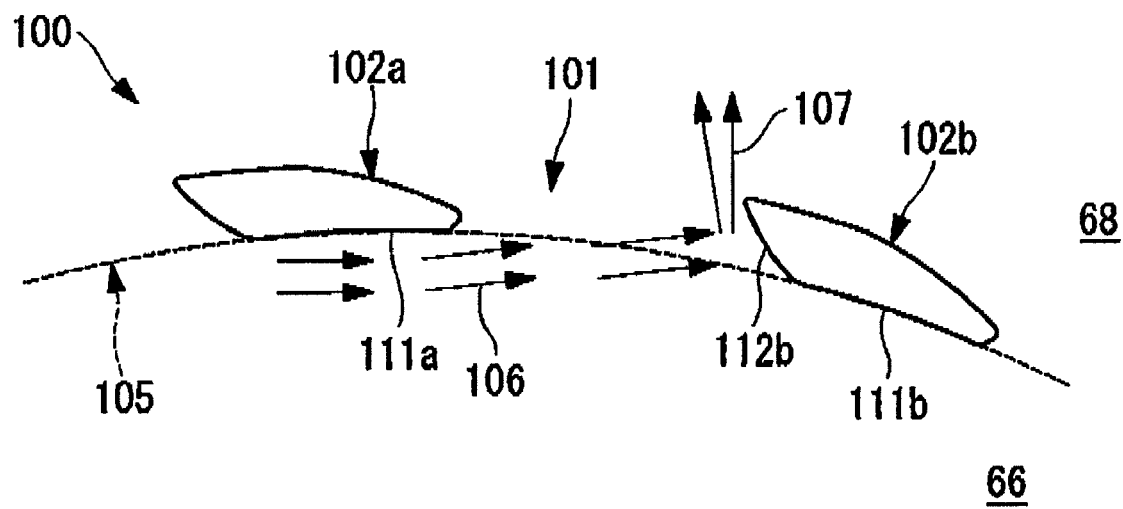
FIG. 10 is a view showing the arrangement of fixed vanes in a conventional turbine.
Figure 11:
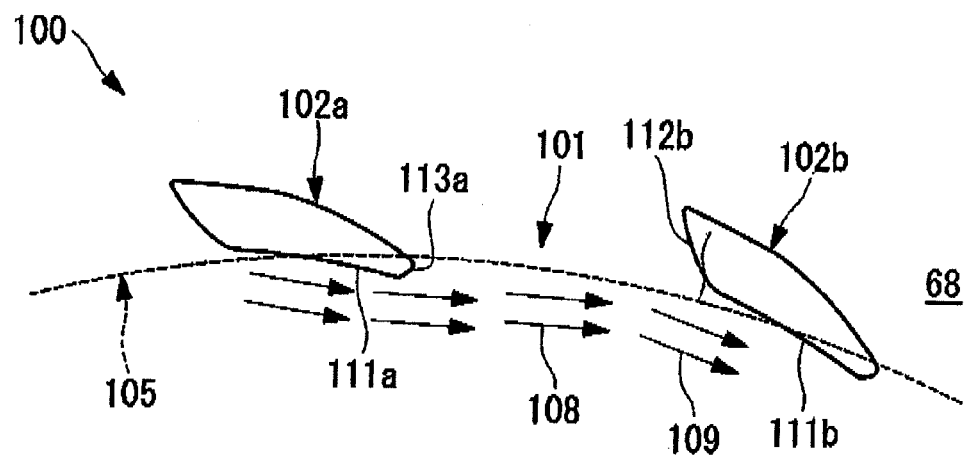
FIG. 11 is a view showing the arrangement of fixed vanes in a turbine according to a third embodiment.

FIGS. 10 and 11 show fixed vanes 102a and 102b, a throat 101, an involute curve 105 that divides a scroll portion 100 into an inner scroll part 66 and an outer scroll part 68, and arrows 106 and 107 that indicate flow path directions of fluid in the inner scroll part 66. FIG. 10 is a partial enlarged view of a conventional turbine. FIG. 11 is a partial enlarged view of a turbine according to this embodiment.

As shown in FIG. 10, in the conventional turbine, fixed vanes 102a and 102b are provided such that their surfaces 111a and 111b facing the inner scroll part 66 fit the involute curve 105. In such a turbine, fluid in the inner scroll part 66 is guided by the surface 111a of the fixed vane 102a in the direction of the arrow 106, then collides with a leading edge 112b of the fixed vane 102b located at the downstream side of the fixed vane 102a and is made to flow in a direction indicated by the arrow 107. As a result, the fluid in the inner scroll part 66 flows into the outer scroll part 68 through the throat 101, leading to a decrease in turbine efficiency.

On the other hand, in the turbine 7 of this embodiment, as shown in FIG. 11, a line extended from a trailing edge 113a of the fixed vane 102a at the side of the inner scroll part 66 is directed farther inside, toward the inner scroll part 66, than the leading edge 112b of the fixed vane 102b, which is located at the downstream side of and is adjacent to the fixed vane 102a.

According to the turbine 7, structured as described above, fluid in the inner scroll part 66 is guided by the surface 111a of the fixed vane 102a in a direction indicated by an arrow 108 and then is made to flow in a direction indicated by an arrow 109 by the surface 111b of the fixed vane 102b located at the downstream side of the fixed vane 102a.

Figure 12:
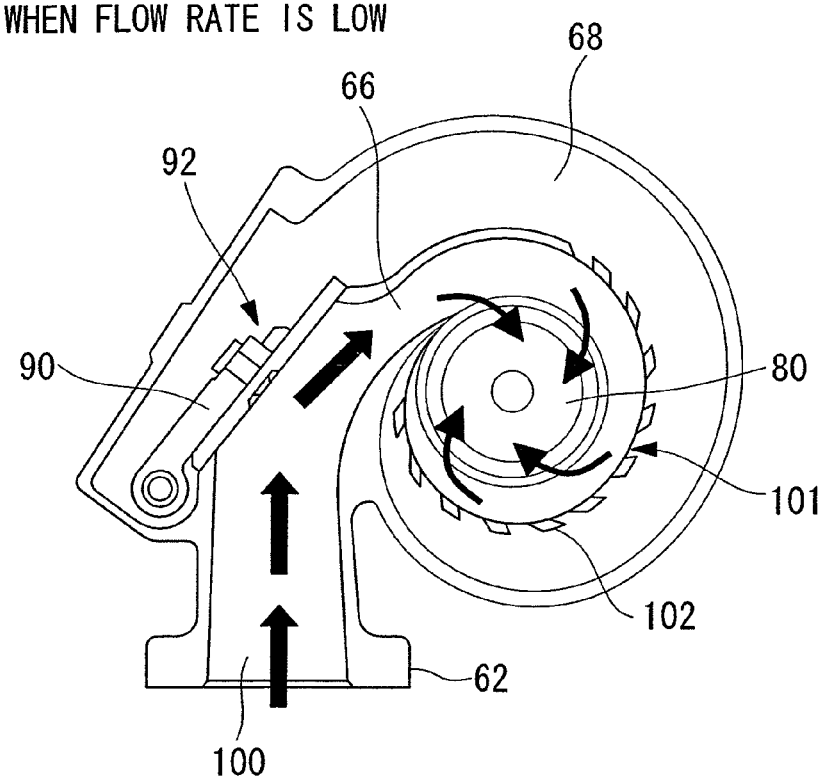
FIG. 12 is a view showing a flow path when the flow rate is low in the turbine shown in FIG. 2.

As shown in FIG. 12, in a low-speed range where the flow rate of exhaust gas is low, the switch valve 90 is switched to the closed position 92 to close the inlet port of the outer scroll part 68 so as to guide the exhaust gas introduced from the exhaust gas inlet port 62 only to the inner scroll part 66, having a smaller capacity, such that the exhaust gas effectively rotates the turbine rotor 80. The exhaust gas which has been introduced to the inner scroll part 66 and whose flow speed has been increased flows in directions tangential to the turbine rotor 80. In other words, the exhaust gas flows into the turbine rotor 80 at an appropriate angle relative to the turbine blades 82 when the rotation of the turbine rotor 80 is taken into account. As a result, the turbine rotor 80 can be effectively rotated.

When a line extended from the trailing edge 113a of the fixed vane 102a at the side of the inner scroll part 66 is directed farther inside, toward the inner scroll part 66, than the leading edge 112b of the fixed vane 102b, which is located at the downstream side of and is adjacent to the fixed vane 102a, the fluid in the inner scroll part 66 is prevented from colliding with the leading edge 112b of the fixed vane 102b and flowing out to the outer scroll part 68 via the throat 101. Therefore, a decrease in performance of the turbine 7 can be prevented.

Although the embodiments of the present invention have been described in detail with reference to the drawings, specific structures are not limited to those embodiments but include design variations made without departing from the scope of the present invention.

For example, although the turbine according to the present invention is applied to a turbocharger in the embodiments, the same effect can be obtained even when the turbine is applied to other equipment.

What is claimed is:

1. A turbine comprising: a turbine rotor which has turbine blades; a housing which accommodates the turbine rotor and whose cross-sectional area of a scroll portion formed between the housing and the turbine rotor gradually decreases; a plurality of fixed vanes which are fixed along a curved line dividing the scroll portion into an inner scroll part and an outer scroll part; communicating parts which are formed between the adjacent fixed vanes and communicate between the inner scroll part and the outer scroll part; and a switch valve which switches a flow path in the housing either to the inner scroll part or to both the inner scroll part and the outer scroll part, wherein flow path areas of the communicating parts are reduced in a downstream direction of the scroll portion, wherein distances between the adjacent fixed vanes are reduced in the downstream direction of the scroll portion.

2. A turbocharger comprising:
the turbine according to claim 1;
a shaft connected to the turbine rotor;
a compressor rotor connected to the shaft at an end opposite to an end to which the turbine rotor is connected; and
a compressor housing accommodating the compressor rotor.

3. A turbine comprising: a turbine rotor which has turbine blades; a housing which accommodates the turbine rotor and whose cross-sectional area of a scroll portion formed between the housing and the turbine rotor gradually decreases; a plurality of fixed vanes which are fixed along a curved line dividing the scroll portion into an inner scroll part and an outer scroll part; communicating parts which are formed between the adjacent fixed vanes and communicate between the inner scroll part and the outer scroll part; and a switch valve which switches a flow path in the housing either to the inner scroll part or to both the inner scroll part and the outer scroll part, wherein flow path areas of the communicating parts are reduced in a downstream direction of the scroll portion, wherein chord lengths of the fixed vanes are increased in the downstream direction of the scroll portion.

4. A turbocharger comprising:
the turbine according to claim 3;
a shaft connected to the turbine rotor;
a compressor rotor connected to the shaft at an end opposite to an end to which the turbine rotor is connected; and
a compressor housing accommodating the compressor rotor.

5. A turbine comprising:
a turbine rotor which has turbine blades;
a housing which accommodates the turbine rotor and whose cross-sectional area of a scroll portion formed between the housing and the turbine rotor gradually decreases;
a plurality of fixed vanes which are fixed along a curved line dividing the scroll portion into an inner scroll part and an outer scroll part;
communicating parts which are formed between the adjacent fixed vanes and communicate between the inner scroll part and the outer scroll part; and
a switch valve which switches a flow path in the housing either to the inner scroll part or to both the inner scroll part and the outer scroll part,
wherein an absolute value of a rate of change of A/R with respect to a fluid flow direction at a first position is made larger than an absolute value of a rate of change of A/R with respect to the fluid flow direction at a second position located at a downstream side of the first position, where A indicates a flow path area of the outer scroll part and R indicates a distance from a flow path center of the outer scroll part to a rotation center of the turbine rotor.

6. A turbocharger comprising:
the turbine according to claim 5;
a shaft connected to the turbine rotor;
a compressor rotor connected to the shaft at an end opposite to an end to which the turbine rotor is connected; and
a compressor housing accommodating the compressor rotor.

* * * * *